April 12, 1960 L. H. LOGUE ET AL 2,932,402
DISC TYPE FILTER
Filed Nov. 15, 1954 4 Sheets-Sheet 1

INVENTORS.
Leland H. Logue
Arthur C. Daman
BY
Horace B. Van Valkenburgh
ATTORNEY

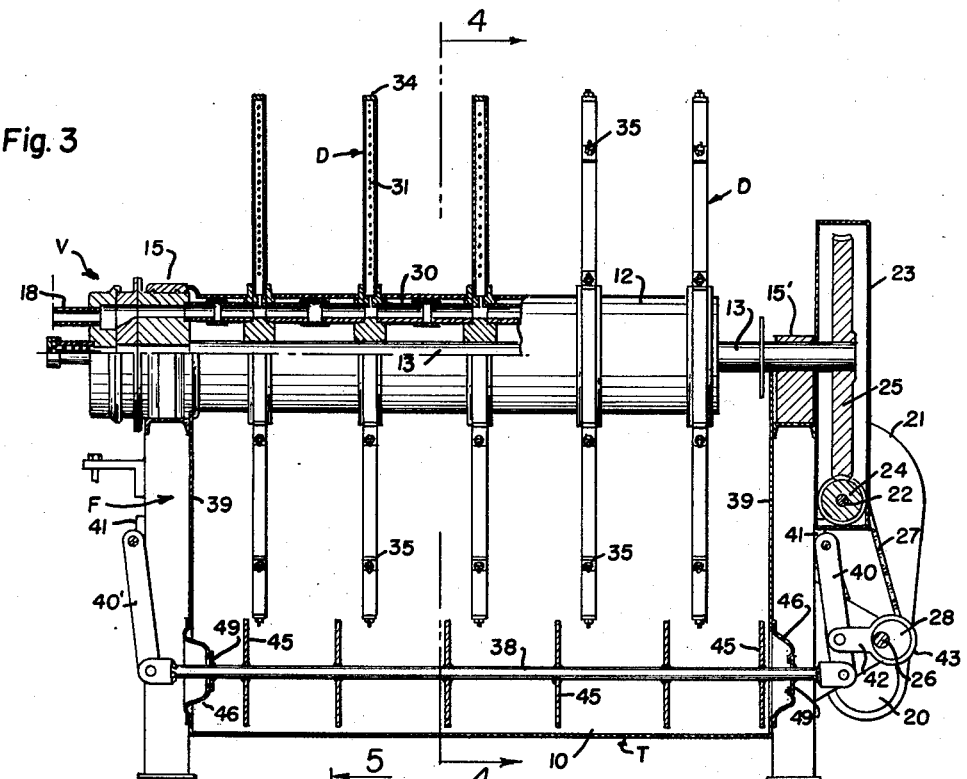
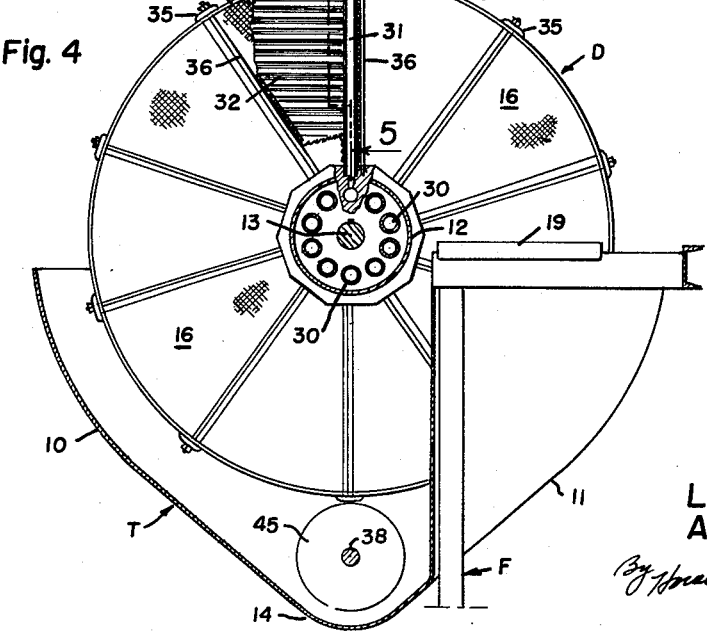
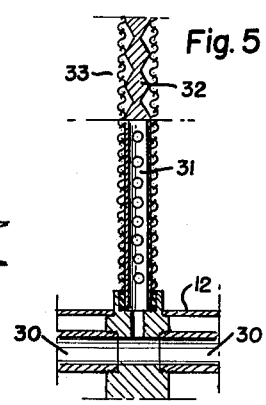
INVENTORS
Leland H. Logue
Arthur C. Daman

April 12, 1960  L. H. LOGUE ET AL  2,932,402
DISC TYPE FILTER
Filed Nov. 15, 1954  4 Sheets-Sheet 3
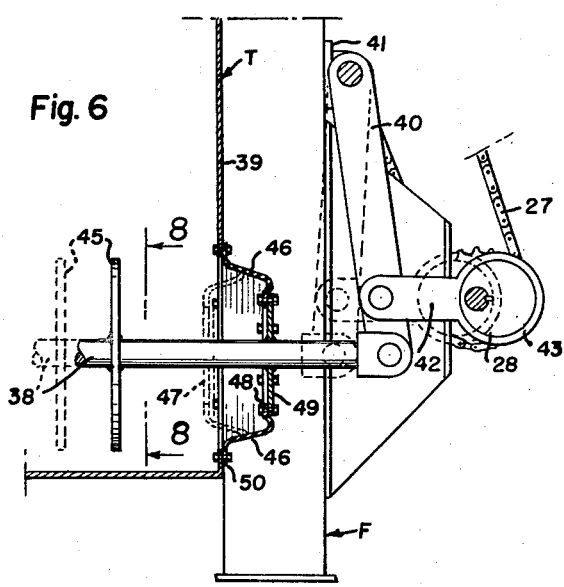
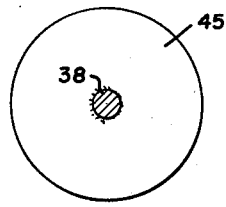
Fig. 8
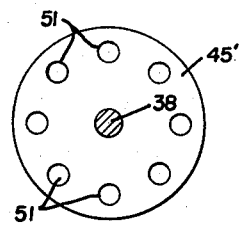
Fig. 9
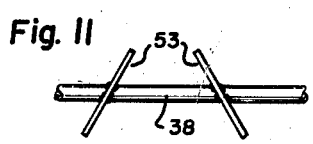
Fig. 11
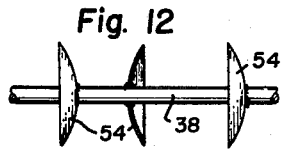
Fig. 12
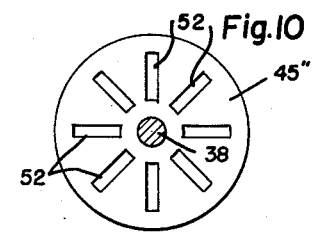
Fig. 10
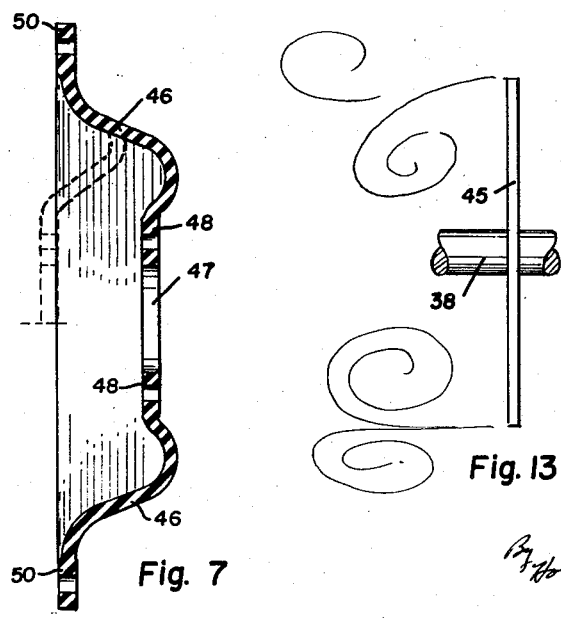
Fig. 7
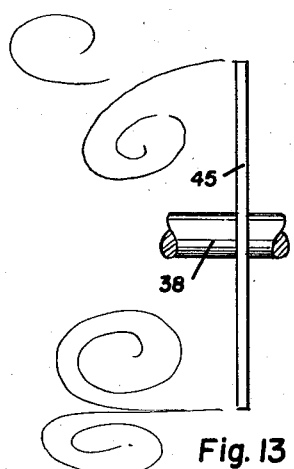
Fig. 13
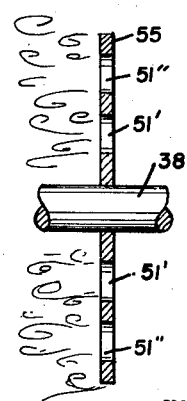
Fig. 14
INVENTORS
Leland H. Logue
Arthur C. Daman
By Horace B. Van Valkenburgh
ATTORNEY April 12, 1960 L. H. LOGUE ET AL 2,932,402
DISC TYPE FILTER
Filed Nov. 15, 1954 4 Sheets-Sheet 4
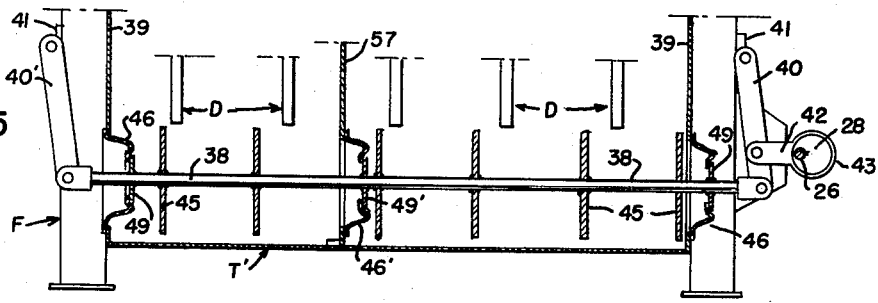
Fig. 15
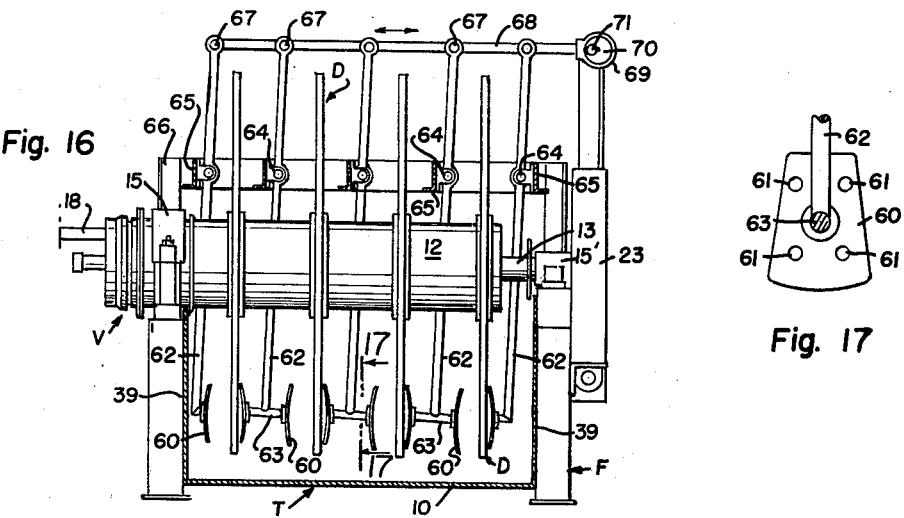
Fig. 16
Fig. 17
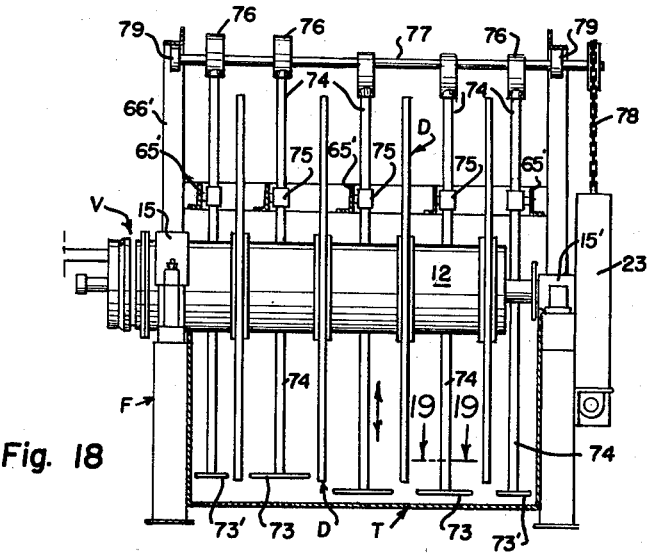
Fig. 18
Fig. 19
INVENTORS
Leland H. Logue
Arthur C. Daman
BY
ATTORNEY

United States Patent Office 2,932,402
Patented Apr. 12, 1960

2,932,402

DISC TYPE FILTER

Leland H. Logue and Arthur C. Daman, Denver, Colo., assignors, by mesne assignments, to Denver Equipment Company, Denver, Colo., a corporation of Colorado Application November 15, 1954, Serial No. 468,846

16 Claims. (Cl. 210—383)

This invention relates to filters and more particularly to disc type filters.

Filters are utilized for removing liquid from a slurry or pulp, usually consisting of a liquid carrying suspended solid of uniform or varying degrees of fineness, in many types of industry. The liquid is most commonly water, although it may be almost any other type of liquid. In the mining industry, the solids are usually concentrates containing ore particles to be recovered, such as following flotation. However, filters may be utilized merely for concentrating pulps and for other purposes. Of the two general types of filters commonly in use, i.e., drum type filters and disc type filters, there are certain advantages to be obtained from the use of each. However, disc type filters, in general, occupy less floor space and also usually can handle greater tonnages of material. A disc type filter ordinarily comprises a tank for containing the pulp, a plurality of discs having segments and rotated about a horizontal axis through the pulp in the tank, a horizontal hollow shaft on which the discs are mounted and containing the piping connections to the disc segments, drive means for the shaft and a special type of valve for producing a vacuum within the segments as they move through the pulp and pressure in the segments as they approach a scraper or other device which removes the cake disposed on the outer surface of the segments as the filtrate is drawn by the vacuum into the interior of the segments, while the segments move through the pulp. The valve may be located at one end of the tank and the drive means for the shaft at the other, although both may be located at the same end. Due to the fact that the pulp contains solids in suspension, these solids tend to settle out or stratify within the tank. Thus, a greater concentration of solids may be produced near the bottom of the tank, with the concentration lessening upwardly to the level of the pulp within the tank. This condition tends to produce a much heavier cake along the outer periphery of the segments than toward the center, i.e., adjacent the shaft. Thus, the cake disposed on the sides of the segments may be quite heavy adjacent the outer ends of the segments and much thinner toward the center with perhaps only a very slight cake adjacent the shaft. Such condition means that the amount of solids which each segment is capable of removing from the pulp is reduced and the capacity of the filter correspondingly reduced. Many improvements have been made in the control valves and in the supports for the filter cloths, as well as in the construction and adaptability of the segments for quick removal and changing of filter cloths for cleaning. Also, the slurry in the tank of a disc type filter has been agitated by a rotating paddle wheel, driven by a rotating shaft extending longitudinally through the bottom of the tank to reduce the tendency toward stratification of the slurry and thereby improve the capacity of the filter and permit a thicker cake to be produced along the central portion of the disc segments. However, a rotating paddle wheel does not entirely eliminate stratification and the packing glands and seals for a rotating shaft are often a constant source of repair troubles and leakage. Furthermore, a rotating paddle wheel tends to produce a concentration of solids at what may be termed the discharge side, depending upon the direction of rotation of the paddle wheel, thereby intensifying the thinness of the slurry on the opposite side. Thus, the maximum effectiveness in withdrawing solids from the pulp, as the segments pass through such thinner pulp, is considerably impaired.

Among the objects of the present invention are to provide a disc type filter in which the tendency for stratification and concentration of solids at the bottom of the tank is reduced to a marked extent or completely overcome; to provide such a filter in which the pulp is agitated in such a manner that the concentration of solids tends to be equalized within the body of pulp; to provide such a filter which eliminates the use of rotating parts within the tank and therefore eliminates the use of packing glands and the like; to provide such a filter which may exist in any one of several different forms and with variations in each; to provide such a filter which may be constructed and operated with comparative economy; and to provide such a filter which will operate efficiently and with a minimum of attention and repair.

Additional objects and the novel features of this invention will become apparent from the description which follows, taken in connection with the accompanying drawings, in which:

Fig. 3 is a vertical longitudinal section of the filter of Figs. 1 and 2;

Fig. 4 is a vertical transverse section, taken along line 4—4 of Fig. 3;

Fig. 5 is a fragmentary radial section taken through one of the disc segments, along line 5—5 of Fig. 4;

Fig. 6 is an enlarged, fragmentary, longitudinal vertical section, similar to a portion of Fig. 3 at the lower right hand corner thereof;

Fig. 7 is an enlarged radial section of a special diaphragm utilized in the filter of Figs. 1–3;

Fig. 8 is a fragmentary vertical section taken along line 8—8 of Fig. 6, illustrating an agitating disc;

Figs. 9 and 10 are fragmentary vertical sections, similar to Fig. 8, illustrating variations of the disc shown therein;

Figs. 11 and 12 are fragmentary side elevations of a rod or shaft and alternative agitating elements mounted thereon;

Fig. 13 is a diagrammatic representation of the action of the disc of Fig. 8;

Fig. 14 is a diagrammatic representation of the action of an agitating disc forming a variation of that shown in Fig. 9;

Fig. 15 is a longitudinal vertical section of the lower end of a filter similar to that of Figs. 1–3, but provided with two compartments for simultaneous filtering of two different pulps;

Fig. 16 is a vertical longitudinal section of a filter constructed in accordance with this invention and forming an additional embodiment thereof;

Fig. 17 is an enlarged, fragmentary vertical section, taken along line 17—17 of Fig. 16;

Fig. 18 is a vertical longitudinal section of a filter constructed in accordance with this invention and forming a further embodiment thereof; and Fig. 19 is an enlarged, fragmentary horizontal section, taken along line 19—19 of Fig. 18.

Figure 1:
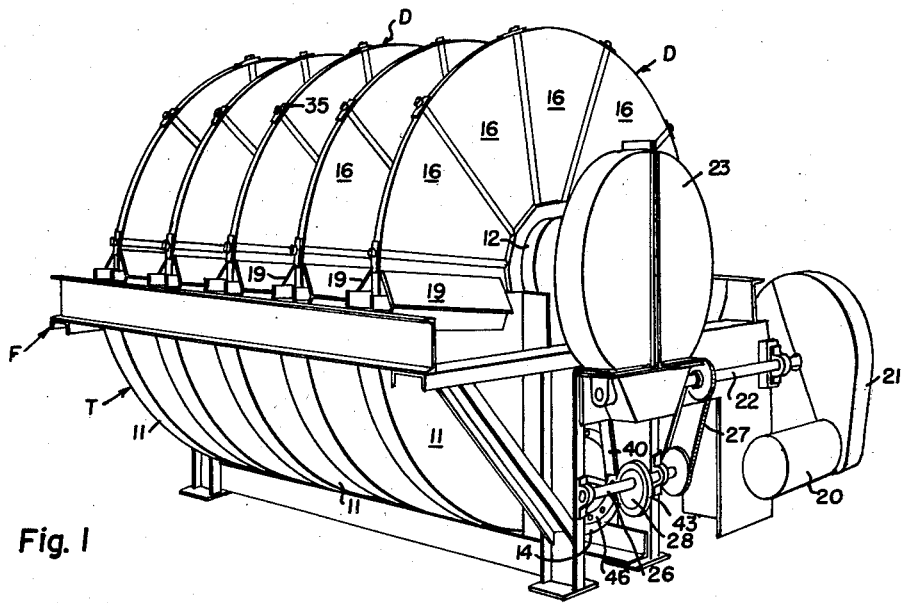
Fig. 1 is a perspective view, from the drive end, of a disc type filter to which the principles of this invention may be applied.
Figure 2:
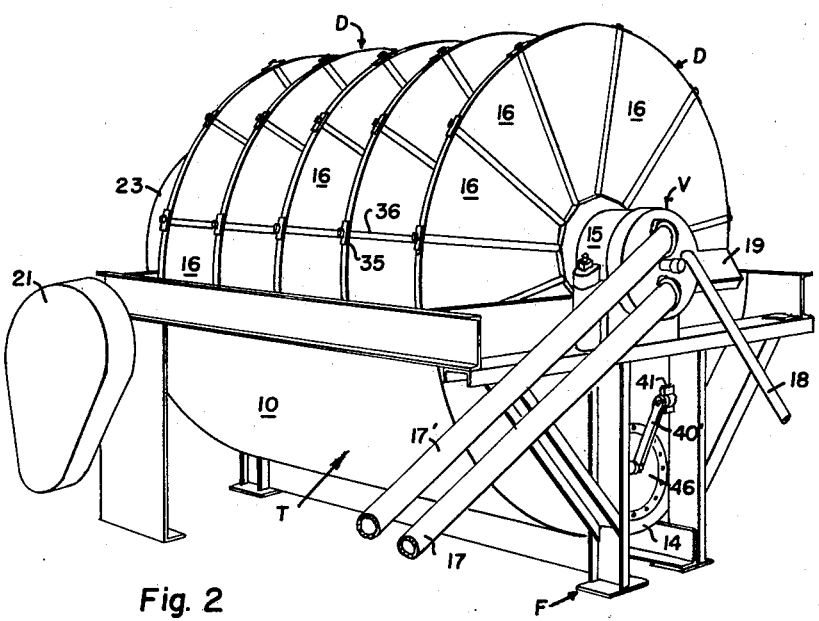
Fig. 2 is a perspective view, from the valve end, of the filter of Fig. 1.

As illustrated in Figs. 1 and 2, the principles of this invention may be applied to a disc filter comprising a tank T adapted to contain a body of pulp and having a generally quadri-cylindrical portion 10 at one side extending the full length thereof, and on the opposite side a plurality of generally quadri-cylindrical wells 11, the number of wells corresponding to and each well accommodating one of a series of discs D which are rotated about a horizontal axis and are mounted on a closed drum 12, in turn mounted on a shaft 13, as in Fig. 3. The bottom of the tank T may be arcuate, or the portion 10 and each of the wells 11 may extend tangentially to a smaller, arcuate bottom well 14, as in Fig. 4.

The tank T may be mounted on a framework F, formed from channels or other suitable structural members and which also supports shaft 13 in bearings 15 and 15', as in Fig. 3. Each disc D may include a series of segments 16, while valve V at one end of tank T, as in Fig. 2, may be connected by vacuum pipes 17 and 17' with a vacuum pump or the like, for producing a vacuum in segments 16, at desired times, and by a pressure pipe 18 with a source of air under pressure. Vacuum may be applied through pipe 17 while each disc segment moves through the pulp, to withdraw filtrate and to cause a cake of solids to be deposited on the sides of the discs. Vacuum may also be applied through pipe 17' to remove additional filtrate which drains from the cake as each segment moves around over the pulp body, or is also displaced by wash water sprayed onto the cake when desired. The cake deposited on the sides of the segments is loosened by air pressure supplied through pipe 18 as each segment reaches a scraper 19, scrapers 19 removing the loosened cake and conveniently being mounted on the discharge side above the wells 11. At the opposite end of tank T, a gear reduction drive motor 20 may be connected through belt driven, speed reducing pulleys enclosed within a housing 21 to a shaft 22 which extends into a gear box 23 enclosing a worm 24 and worm gear 25, as in Fig. 4, for driving the disc shaft 13 at a suitable speed, worm 24 being mounted on shaft 22 and worm gear 25 on shaft 13. Shaft 22 also drives a countershaft 26, as through a chain 27 and suitably mounted sprockets associated therewith, while an eccentric 28 is mounted on shaft 26 to produce longitudinal reciprocal motion of an agitator disposed in the bottom of the tank in accordance with this invention, as hereinafter described.

The valve V, complete details of which are not described herein because such a valve is conventional, is connected by suitable piping, including pipes 30 shown in Figs. 3 and 4, with the disc segments 16 to produce vacuum and pressure over predetermined portions of the path of rotation of each segment, as described above. Each disc D may be constructed in the manner disclosed and claimed in U.S. Patent No. 2,460,280, granted February 1, 1949, each segment thus including a radially extending pipe 31, as in Figs. 4 and 5, through which vacuum and pressure, as well as drainage of filtrate, may be produced in the individual segments. Each segment also may include a segmental block 32 having parallel slots therein disposed at an angle such that complete drainage of each segment may be accomplished before pressure is applied and the cake removed. Each block 32 is disposed inside a double segmental filter cloth 33, the open outer ends of which are folded over and clamped against the block by an arcuate bar 34, which is held in position by a nut tightened clamp 35 on the end of each adjacent radial rod 36, which also supports and holds the segment in position, each block 32 being positioned between a pipe 31 and a rod 36, with the filter cloth 33 also enclosing the pipe 31. If desired, bars 34 may be omitted and the folded edges of the filter cloth merely tacked to the ends of the segmental blocks 32, which are preferably made of wood.

In accordance with the present invention, a disc type filter is provided with agitating means in the bottom thereof, and drive means for reciprocating said agitating means. Conveniently, the agitating means includes a rod 38, extending longitudinally in the bottom of the tank and through an aperture in each end wall 39 thereof, as in Fig. 3, being supported for movement by arms 40 and 40', respectively, each pivoted at its lower end to the respective end of rod 38 and pivoted at its upper end in a suitable manner, as on a bracket 41 mounted on the framework F. At the drive end, arm 40 is pivoted to one end of a link 42 which is provided at its opposite end with a strap or bearing 43 which surrounds eccentric 28 and is reciprocated as the eccentric 28 rotates with shaft 26. A plurality of plates, such as discs 45, are mounted on rod 38 for agitating the pulp when rod 38 is reciprocated, the agitating action being described later.

In further accordance with this invention, the ends of the rod 38, where the rod extends through the ends of the tank T, are sealed by a special diaphragm 46 which has a central hole 47 therethrough through which the rod 38 extends, an inner flange 48 which surrounds hole 47 and which may be clamped to a plate 49 mounted on rod 38 and an outer flange 50 by which the diaphragm may be clamped to the end wall 39 of tank T around the aperture, as in Fig. 6. As in Fig. 7, the annular portion of the diaphragm between flanges 48 and 50 has a radial section corresponding to a catenary curve, the diaphragm conveniently being made of molded rubber reinforced by cords or fabrics. The catenary curve of the annular mid-section permits the diaphragm to be flexed, such as between the dotted and full positions of Fig. 6, without undue stress during flexing, since at the extreme point in one direction the mid-section of the diaphragm is generally arcuate adjacent flange 48, as in the full position of Fig. 6, while at the extreme point in the opposite direction, the mid-section of the diaphragm is generally arcuate at a point closer to flange 50. Thus, the generally arcuate portion of the diaphragm moves between the flanges, although the diaphragm corresponds to a catenary curve in all positions. The disadvantage of a diaphragm which, without stress, is flat, is that in moving to either extreme position, the diaphragm is stretched and the repeated stresses during flexing tend to cause breakage. Preferably, the diaphragm 46 at one end of the tank faces in the opposite direction from the diaphragm at the other end of the tank so that the greater pressure, such as from the pulp body as compared to atmospheric pressure outside the tank, acts against the concave side of the catenary curve.

The disk 45, as shown in Figs. 3, 4, 6 and 8 may be circular and extend perpendicularly to rod 32, while disc 45 may be solid, as in Fig. 8, or other types of plates or discs may be substituted therefor, such as illustrated in Figs. 9–12 and 14. Thus, the disc 45' of Fig. 9 may be provided with an annular set of circular holes 51, while the disc 45" of Fig. 10 may be provided with a plurality of slots 52 which may extend radially, as shown, or be disposed in any other desired pattern. The discs 45, or the alternative discs of Figs. 9 and 10, may be disposed in any desired position relative to the filtering disc D, such as to reciprocate between the full and dotted positions of Fig. 6, with one disc 45 being disposed between each adjacent pair of filtering discs D and single discs 45 at the ends of the tank, beyond the filtering discs D. As shown in Fig. 11, a series of non-circular inclined plates 53 may be mounted on the rod 38, the plates 53 being inclined so that each pair will be closer together adjacent the upper ends than the lower ends and positioned so that the upper ends thereof will be between each pair of filtering discs D, although any other desired inclination or arrangement of plates 53 may be used. When the plates are non-circular, the lower edges thereof may be convex, such as to correspond in shape to the bottom of the tank, while the upper edges may be concave, such as to correspond to the lower ends of the filtering discs, although other non-circular shapes may be utilized if desired. Also, the plates may be flat or may be curved, such as illustrated in Fig. 12, wherein cup-shaped plates 54 are substituted for discs 45, with the concave surfaces thereof facing toward the adjacent filtering discs D, the plates 54 thereby being disposed in pairs between each adjacent pair of filtering discs D with one cup-shaped plate 54 at each end beyond the end filtering disc D.

As will be evident, the action of a reciprocated disc, plate or other agitating means in the bottom of the tank is different from that of a paddle wheel. Thus, as illustrated in Fig. 13, the vortices in the pulp produced by reciprocation of the discs 45 will produce eddy currents which move not only between the discs and around the periphery thereof, but towards the upper levels of pulp, as well as toward the bottom of the tank. The eddy currents produced by agitation of the discs, which are preferably reciprocated at a considerably faster rate than the rate of rotation of the filtering discs D, will thus cause heavier strata to move upwardly into the thinner strata toward the upper level of pulp, as well as moving heavier strata from the bottom of the tank and upwardly along the sides thereof. This reciprocation of the agitating means thus tends to equalize the density of the pulp throughout the body thereof, so that not only is the tendency for stratification with a greater density at the bottom of the pulp body overcome, but also the density of the pulp body tends to be equalized at each side. Therefore, as the segments 16 of the filtering discs D move through the pulp, pulp of substantially uniform density will be encountered at each radial position and substantially equal amounts of cake will be deposited during movement through one side of the pulp body, as through the other side, as well as a more uniform cake and particularly as heavy a cake toward the center of the segments as toward the edges, will be produced.

As illustrated in Fig. 14, a disc 55 similar to the disc 45' of Fig. 9 but having an inner series of holes 51' and an outer series of holes 51", will also produce vortices and eddy currents, first at one side and then on the opposite side of the disc as it is reciprocated, these vortices and eddy currents causing a more thorough mixing of the pulp and also the movement of heavier strata from the bottom toward the top of the pulp, substantially equally at each side.

The embodiment illustrated in Fig. 15 is similar to the filter of Figs. 1–3, except that the tank T' is provided with a transversely extending partition 57 which divides the tank into two compartments, so that one type of pulp may be treated in one compartment and another type of pulp in the other compartment. The drive means for reciprocating the agitating means may include parts similar to those illustrated in Fig. 3 and described in connection therewith, the same reference numerals appearing thereon in Fig. 15 as in Fig. 3. The rod 38 also extends through an aperture provided for that purpose in partition 57 and the two compartments on opposite sides of the partition 57 are separated by a diaphragm 46', preferably constructed identically to diaphragm 46 at each end of the tank and attached by its outer flange to the partition 57 and by its inner flange to a plate 49', mounted on rod 38 for that purpose. The rod 38 may be provided with discs 45 as in the embodiment of Fig. 3, or any of the alternative plates or other agitating means, such as illustrated in Figs. 9–12 and 14. The operation of the reciprocated agitating means of Fig. 15 is substantially identical to that previously described in connection with the previous embodiment, such agitation tending to overcome stratification and produces a more uniform pulp throughout each of the tank compartments.

In the embodiment illustrated in Figs. 16 and 17, the filter may be substantially identical with that illustrated in Figs. 1–3, including a tank T, a valve V, discs D and suitable drive means for rotating shaft 13 and disc drum 12. The agitating means includes a series of plates 60 which may be round or have any other suitable shape, such as trapezoidal, as shown in Fig. 17, and may be provided with a series of holes 61. Each plate 60 may be formed of a slightly flexible material, such as a rubber composition, each preferably being concave on the side facing a disc D, as in Fig. 16. Thus, a pair of facing plates 60 are disposed on opposite sides of each disc D. The plates 60 not only produce agitation of the pulp in the tank T by reciprocation longitudinally of the tank, but also, as each approaches the respective disc, tend to produce a pressure effect toward the discs, it being noted that, in the previous embodiments, the agitating means is preferably disposed in the tank beneath the lower edges of the disc D, whereas the plate 60 of Fig. 16 are preferably placed between the discs just above the lower edges of the disc. The foregoing pressure effect tends to force concentrated pulp upwardly toward the upper edges of the disc segments as they move through the pulp, in the position of Fig. 16 as well as to each side. The holes 61, of course, tend to create additional vortices and eddy currents, while pulp forced downwardly from the lower edges of plates 60 tends to move laterally along the side of the tank from the bottom thereof and then upwardly.

To reciprocate the plates 60 without the necessity for any seals being provided in the lower portion of the tank, a series of levers 62 may extend downwardly into the tank in alternating relation to the discs D, each lever 62 supporting one or more plates 60 at its lower end, as by the end plates 60 being connected directly to the end levers 62 and a pair of intermediate plates 60 being mounted on a bar 63 attached to the lower end of each intermediate lever 62. Each lever 62 is pivotally mounted at an intermediate point on a bracket and pin assembly 64, in turn mounted on a transversely extending bar 65 of an auxiliary framework 66. At its upper end, each lever 62 is pivotally attached, as by a pin 67, to a reciprocating rod 68, which at one end is provided with a bearing 69 surrounding an eccentric 70 which is mounted on a countershaft 71, conveniently rotated from the drive means for the filter in any suitable manner, such as similar to the manner in which countershaft 26 of Figs. 1 and 3 is driven.

In the embodiment illustrated in Fig. 18, a plurality of intermediate discs 73 and normally slightly smaller end discs 73' are reciprocated upwardly and downwardly, as by upward and downward movement of a series of rods 74, each of which extends through a bearing 75 pivotally mounted on a bar 65', in turn supported by an auxiliary framework 66' and extending in alternating relation to the discs D across and above the tank T. Rods 74 are provided at their upper ends with bearings 76 which engage eccentrics mounted on a shaft 77 in a manner similar to bearing 43 and eccentric 28 of Fig. 15. Shaft 77 is mounted above the tank T and rotated from the drive means for the filter in any suitable manner, as through a chain belt 78, the shaft 76 being mounted in suitable bearings 79 and supported by auxiliary framework 66'. While the discs 73 and 73' of Fig. 18 are reciprocated upwardly and downwardly, rather than longitudinally of the tank T, their position near the bottom of the tank produces a movement of the pulp within the tank to each side and upwardly along the sides, as well as more local agitation, thereby causing the particles in the pulp to be distributed more evenly throughout the body of the pulp and thus permitting the disc segments to move through a more uniform body of pulp. As indicated previously, this results in the deposition of a more uniform thickness of cake on the sides of the disc segments and also a more uniform withdrawal of filtrate along the entire area and path of each disc segment.

From the foregoing, it will be evident that a filter constructed in accordance with this invention fulfills to a marked degree the requirements and objects hereinbefore set forth. Thus, longitudinally reciprocated agitating means disposed in the bottom of the pulp tank permits a diaphragm seal to be utilized, thereby overcoming the difficulties previously encountered with packing and similar types of seals for rotating parts. Also, reciprocating agitating means tends to produce a more uniform dispersion of the particles in the pulp than rotating agitating means. In addition, the agitating means can be reciprocated by actuating means which extends into the tank from above and therefore requires no seal at all. While several variations in the discs or other types of agitating devices have been illustrated and described, and the agitating means has been shown to be reciprocable not only longitudinally of the tank, but also upwardly and downwardly, it will be understood that numerous other variations may be made in the agitating means and also the drive therefor.

Thus, other embodiments may exist and various changes may be made therein without departing from the spirit and scope of this invention.

What is claimed is:

1. A filter comprising a tank for containing a body of pulp, said tank having parallel end walls with each end wall having an aperture in the lower portion thereof; filtering means rotatable about a horizontal axis and through said pulp in said tank; a rod beneath said filtering means and extending longitudinally in the lower portion of said tank and through the aperture in each end wall thereof; plates mounted on said rod for agitating said pulp; means outside said tank for reciprocating said rod; and a flexible diaphragm mounted in and sealing each said aperture, said rod extending through and being connected to each said diaphragm at the respective end of said tank.

2. In a filter as defined in claim 1, wherein each said diaphragm is generally annular and the operating portion thereof has a radial section initially corresponding to a catenary curve.

3. A filter as defined in claim 1, wherein said agitating plates are disposed transversely to said rod.

4. A filter as defined in claim 1, wherein said agitating plates extend at an angle to said rod.

5. A filter as defined in claim 1, wherein said agitating plates are provided with holes.

6. A filter as defined in claim 1, wherein said agitating plates are provided with slots.

7. A filter as defined in claim 1, wherein said agitating plates are cup-shaped.

8. A filter as defined in claim 7, wherein said filtering means includes a plurality of discs and the open end of each agitating plate faces toward a filtering disc.

9. A filter comprising a tank for containing a body of pulp; filtering means including a plurality of filtering discs rotatable about a horizontal axis and through said pulp; means disposed in the lower portion of said tank for agitating said pulp; a plurality of rods extending downwardly between the respective filtering discs for reciprocating said agitating means; and drive means above said tank for actuating said rods.

10. In a filter as defined in claim 9, wherein the lower ends of said rods are reciprocated horizontally and longitudinally of said tank.

11. In a filter as defined in claim 9, wherein the lower ends of said rods are reciprocated upwardly and downwardly.

12. A filter comprising a tank for containing a body of pulp; filtering means including a plurality of filtering discs rotatable about a horizontal axis and through said pulp; a series of plates spaced longitudinally in the lower portion of said tank for agitating said pulp; rods extending downwardly between said filtering discs for reciprocating said agitating plates; and drive means above said tank for actuating said rods.

13. In a filter as defined in claim 12, wherein said agitating plates comprise trapezoidal plates formed of resilient material, each having a plurality of holes therein and the concave surface thereof facing the side of a filtering disc adjacent but above the lower end of said disc; said rods are disposed in alternating relation to said filtering discs with a single agitating plate mounted at the lower end of the end rods and a pair of spaced and oppositely facing plates mounted at the lower end of each intermediate rod; each rod is pivoted at an intermediate point and supports for the pivots extend between said discs above said tank; and said drive means includes a horizontally disposed member pivotally connected to the upper end of each said rod and means for reciprocating said member.

14. In a filter as defined in claim 12, where said agitating plates comprise flat discs mounted in generally horizontal position on the lower ends of said rods adjacent the lower ends of said filtering discs; said rods are disposed in alternating relation to said filtering discs and each engages at an intermediate point a pivoted bearing with supports for said bearing extending between said discs above said tank; and said drive means includes a rotating shaft mounted in horizontal position and extending longitudinally of said tank and means interconnecting said shaft and said rods for imparting a reciprocatory motion to said rods as said shaft rotates.

15. A filter comprising a tank for containing a body of pulp, said tank having end walls each provided with an aperture in the lower portion thereof; filtering means rotatable about a horizontal axis and through said pulp; a rod disposed below said filtering means and extending longitudinally of said tank and through said apertures in the end walls thereof; pulp agitating means mounted on said rod; an arm pivotally connected to each end of said rod and pivotally mounted thereabove; a flexible diaphragm at said aperture in each end wall of said tank, each diaphragm having a central hole surrounded by an inner flange, an outer flange and an annular portion between said flanges corresponding in radial section to a catenary curve; an annular plate mounted on said rod at the position of each said diaphragm and attached to the inner flange of the corresponding diaphragm, said outer flange of each diaphragm being attached to the end wall of said tank; a lever pivotally connected at one end to one said arm, and provided at its opposite end with a bearing; a countershaft having an eccentric enclosed by said bearing; and means for rotating said countershaft.

16. A filter comprising a tank for containing more than one body of pulp, said tank having end walls each provided with an aperture in the lower portion thereof; at least one transverse partition dividing said tank into a plurality of compartments, each partition having an aperture in the lower portion thereof; filtering means including a plurality of filtering discs rotatable about a horizontal axis and through said pulp with at least one of the filtering discs movable through the pulp in each compartment; a rod disposed below said filtering discs and extending longitudinally of said tank and through said apertures in the end walls thereof and also through said aperture in each partition; an arm pivotally connected to each end of said rod and pivotally mounted thereabove; pulp agitating means mounted on said rod; a diaphragm at each aperture in said end walls of said tank and each partition, each diaphragm having a central hole surrounded by an inner flange, an outer flange and an annular portion between said flanges corresponding in radial section to a catenary curve; an annular plate mounted on said rod in a position corresponding to each said diaphragm attached to the inner flange of the corresponding diaphragm, said outer flange of each diaphragm being attached to the respective partition and end wall of said tank; a lever pivotally connected at one end to one said arm and provided at its opposite end with a bearing; a countershaft having an eccentric enclosed by said bearing; and means for rotating said countershaft.

References Cited in the file of this patent

UNITED STATES PATENTS

| | | |
|---|---|---|
| 1,087,647 | Drage | Feb. 17, 1914 |
| 1,212,932 | Genter | Jan. 16, 1917 |
| 1,243,630 | Ronning | Oct. 16, 1917 |
| 1,359,578 | Costello | Nov. 23, 1920 |
| 1,446,448 | Brown | Feb. 27, 1923 |
| 1,932,385 | Gault | Oct. 24, 1933 |
| 2,079,549 | De Cremer | May 4, 1937 |
| 2,124,983 | Martin | July 26, 1938 |
| 2,152,455 | Ballentine | Mar. 28, 1939 |
| 2,202,860 | McPhee et al. | June 4, 1940 |
| 2,312,620 | Bowman | Mar. 2, 1943 |
| 2,596,082 | Stuart | May 6, 1952 |
| 2,699,872 | Kelsey | Jan. 18, 1955 |

FOREIGN PATENTS

| | | |
|---|---|---|
| 1,055,182 | France | Oct. 14, 1953 |